United States Patent
MacDonald

(10) Patent No.: US 9,726,576 B2
(45) Date of Patent: Aug. 8, 2017

(54) EQUIPMENT MONITORING SYSTEM

(71) Applicant: ROLLS-ROYCE PLC, London (GB)

(72) Inventor: Andrew Peter MacDonald, Stonehouse (GB)

(73) Assignee: ROLLS-ROYCE plc, London (GB)

( * ) Notice: Subject to any disclaimer, the term of this patent is extended or adjusted under 35 U.S.C. 154(b) by 392 days.

(21) Appl. No.: 14/223,532

(22) Filed: Mar. 24, 2014

(65) Prior Publication Data
US 2014/0331751 A1   Nov. 13, 2014

(30) Foreign Application Priority Data

May 10, 2013 (GB) .................................. 1308397.7

(51) Int. Cl.
G01M 15/14 (2006.01)
G01D 3/08 (2006.01)

(52) U.S. Cl.
CPC .............. *G01M 15/14* (2013.01); *G01D 3/08* (2013.01)

(58) Field of Classification Search
CPC ..................................................... G01M 15/14
USPC ...................................................... 73/112.01
See application file for complete search history.

(56) References Cited

U.S. PATENT DOCUMENTS

| | | | | |
|---|---|---|---|---|
| 4,401,949 A * | 8/1983 | Gold | ....................... | F02P 17/00 324/402 |
| 5,680,409 A | 10/1997 | Qin et al. | | |
| 2008/0133149 A1* | 6/2008 | Ponziani | ............... | G01M 15/14 702/45 |
| 2009/0010302 A1* | 1/2009 | Wilde | .................... | G01K 15/00 374/1 |
| 2009/0201972 A1* | 8/2009 | Grozinger | ............. | G08C 19/02 374/141 |
| 2010/0026322 A1* | 2/2010 | Gehrke | .................. | G01R 27/14 324/691 |

(Continued)

FOREIGN PATENT DOCUMENTS

| | | |
|---|---|---|
| DE | 4035403 A1 | 5/1992 |
| DE | 102005062389 A1 | 6/2007 |

(Continued)

OTHER PUBLICATIONS

Search Report issued in British Application No. 1308397.7 dated Sep. 24, 2013.

(Continued)

*Primary Examiner* — Lisa Caputo
*Assistant Examiner* — Jamel Williams
(74) *Attorney, Agent, or Firm* — Oliff PLC

(57) ABSTRACT

The invention concerns an asset monitoring system (10) having a monitoring unit 8 and a plurality of sensors (4) onboard the asset. The sensors (4) are arranged to measure a plurality of operational variables for the asset in use and the monitoring unit (8) is arranged to receive operational variable measurements output from the sensors. The monitoring unit is also arranged to determine a current value of a sensor characteristic ($Z_{A1}$; $Z_{B1}$) for each sensor and to compare the current sensor characteristic value with a predetermined sensor characteristic value in order to determine automatically whether a change of one or more sensors has occurred between instances of operation.

16 Claims, 4 Drawing Sheets

(56) References Cited

U.S. PATENT DOCUMENTS

2017/0089723 A1* 3/2017 Heide ...................... G01D 3/08

FOREIGN PATENT DOCUMENTS

| JP | H11183418 A | 7/1999 |
|----|----|----|
| WO | WO 2007/133543 A2 | 11/2007 |
| WO | WO 2011/003688 A1 | 1/2011 |

OTHER PUBLICATIONS

Mar. 5, 2015 Search Report issued in European Application No. 14161298.

* cited by examiner

EQUIPMENT MONITORING SYSTEM

BACKGROUND OF THE INVENTION

The present invention relates to asset condition or health monitoring and more particularly to the monitoring of machines in service.

Asset health monitoring, commonly referred to as equipment health monitoring (EHM), is based around the premise of sensing a plurality of operational variables for an asset during use. The gathered data can be used to determine an operational state of the asset. Additionally the data can be processed to identify the current condition or health status of the equipment. The output of the EHM system provides information to an operator which can be used to manage the operation of the equipment, for example by controlling the equipment in a manner which is sympathetic to the condition of the equipment or else by scheduling suitable repair or maintenance work.

The level of sophistication of an EHM system is often determined by the value or complexity of the asset. More particularly, sophisticated EHM systems are most often implemented where the cost of maintenance work to be carried out on the assets is relatively high. This therefore demands that maintenance schedules are optimised so that maintenance can be carried out effectively at appropriate intervals and with minimal disruption to the asset operation.

Gas turbine engines are one example of an asset for which EHM systems are becoming crucial to efficient asset management. In contrast to more immediate control systems, EHM systems for gas turbine engines look for anomalies in the long term trends of measured engine parameters. It is known to undertake trending of process variables (measured parameters) in order to improve condition monitoring without necessitating additional sensors or processing. Examples of such trending are described in WO/2007/133,543. Methods for identifying features in received sensor data and determining a machine operation diagnosis from such features are disclosed in WO/2011/003688.

It is also known to receive sensor readings of operational parameters and to use those readings for the more immediate control of equipment, for example by way of one or more on-board control units. Such systems allow more-critical, automatic control of equipment substantially in real-time, as opposed to EHM systems which concern longer term trending and analysis of data. Accordingly the algorithms used to process the received data in such scenarios differ significantly.

It has been found that, when a system component, such as a sensor, is changed between instances of use of the equipment (i.e. in service) a disturbance in the data trend may be caused. This disturbance can look similar to an anomaly caused by an adverse operational event. Thus an adverse event alert may be output by the EHM system, causing effort to be expended in trying to identify the cause of the anomaly. Such an investigation must assess a possible change in asset operation that may have caused the alert as well as the possibility that a system component may have been changed (i.e. that the asset is otherwise operating normally).

Such investigations can be manually time consuming, due to the need to access service and maintenance records for the asset and/or contact a service engineer to determine any relevant system changes that may have occurred at the time of the anomaly, and cause uncertainty over the operational state of the asset in the interim.

It is generally known in the art that engineering components can be provided with RFID tags to allow identification of components within a system by reading data stored on the tag. However such systems are electronically complex and costly to implement. Every component in such a system would require a unique RFID tag in order to be able to identify a change. Furthermore, components in some assets, such as gas turbine engines, are required to operate in harsh environments, which may impede use the use of such electronics. Also complex wiring or wireless systems would need to be installed in addition to existing local networks for the asset, which can already present significant installation and/or maintenance costs.

It is an aim of the invention to provide an asset monitoring system for which component changes can be accommodated in a manner that is better suited to the operation of the monitoring system.

BRIEF SUMMARY OF THE INVENTION

According to a first aspect of the invention there is provided an asset monitoring system comprising a monitoring unit and a plurality of sensors onboard the asset, the sensors arranged to measure a plurality of operational variables for the asset in use and the monitoring unit arranged to receive operational variable measurements output from the sensors, wherein the monitoring unit is arranged to determine a current value of a sensor characteristic for each sensor and to compare the current sensor characteristic value with a predetermined sensor characteristic value in order to determine automatically whether a change of one or more sensors has occurred between instances of operation.

It will be appreciated that a sensor characteristic differs from the output of the sensor during its normal sensing function (i.e. the change in the one or more properties of the sensor that occurs across its normal operating range). The sensor characteristic may be a passive characteristic as opposed to an active characteristic used for taking operational variable measurements for the asset. The sensor characteristic of the sensor may be substantially constant over the sensor's normal operating range or else may change over a magnitude of scale that is significantly less than the changes in the sensor properties used to measure the operational variable of the asset.

The sensor characteristic may be an operational characteristic of the sensor.

The monitoring unit may determine automatically whether a change of one or more sensors has occurred between instances of operation of the asset.

The sensor characteristic may be an integral or intrinsic characteristic of the sensor. Additionally or alternatively, the sensor characteristic may comprise a characteristic of a component added to the sensor, e.g. a dedicated component, for example outside of its normal sensing function.

Ideally the sensor characteristic is common to a plurality of sensors. The monitoring unit may thus be able to determine a common sensor characteristic for a number of different types of sensor used in the system.

The sensor characteristic may comprise an electrical or electronic property of the sensor. The sensor characteristic may comprise a measure of conductivity for the sensor such as a resistance or impedance of the sensor. Additionally or alternatively, the sensor characteristic may comprise a counter-electromotive force (or back EMF) or bias current or similar measurable electrical property.

The monitoring unit may determine the sensor characteristic over a range of variance for said sensor characteristic. Such variance may occur for example to natural variance in material properties, manufacturing tolerances or other properties for the sensor. The monitoring unit may determine the sensor characteristic with a resolution of at least 1 in 100 (i.e. at least one hundredth of the range of variance for the sensor).

In one example, the predetermined sensor characteristic value is a threshold value or band for the sensor characteristic of the sensor. The monitoring unit may provide a digital output corresponding to whether or not the current determined sensor characteristic value exceeds said threshold value or band (i.e. +/− threshold around the predetermined value). That digital output may indicate whether or not a sensor has been changed.

In one example, the predetermined sensor characteristic value is one or more previously stored values for the sensor characteristic. The previously stored value may be the preceding value, e.g. stored for a previous instance of use of the asset.

The previously stored value may be determined from a plurality of previously stored values, such as an average or trend of previously stored values.

Each sensor may have an identifier. The identifier may comprise an alphanumeric string or code or other form of identification data. The identifier is preferably common to all sensors or components of the same type. The identifier may be, or comprise, a part number. Thus the sensor characteristic is distinct from the identifier or any other data used to identify the sensor.

In one example of the invention, the monitoring unit may also determine one or more identifier for each sensor. The identifier may be read from the sensor.

The monitoring unit may determine the current value of the sensor characteristic for each sensor for each instance of use of the asset. The determination may be made at the start of each instance of use, for example as part of a start-up procedure. An instance of use may be determined in dependence upon a supply (or cessation or reduction) of power to the asset or one or more portions thereof, for example including to the monitoring unit and/or sensors. An instance of use may be determined from one or more sensor readings.

The monitoring unit may determine the current value of the sensor characteristic one or more time after the start of each instance of use, for example, incrementally during an instance of use and/or at an end of an instance of use.

In some embodiments, the monitoring unit may use the determined value of the sensor characteristic to qualify a value of the operational variable measurement output from the sensor or vice versa.

In one example, the current sensor characteristic may be used to identify the type of sensor. For example, each sensor of a particular type may have associated therewith a band or range of sensor characteristic values (e.g. the predetermined characteristic values). If the current sensor characteristic value falls within the range, of one sensor type, it may be identified as being that type of sensor. Each sensor type or range of sensor characteristic values may have a probability distribution associated therewith (e.g. a normal distribution).

The asset is typically a high value asset and may comprise a machine. The asset may comprise a complex machine, for example having multiple sub-assemblies and/or hundreds or thousands of components. The asset may comprise a machine for use aeronautical, power generation or any other industrial application. The asset may comprise an engine, such as, for example, a gas turbine engine.

The monitoring system may comprise tens or more than a hundred sensors.

According to a second aspect of the invention there is provided an asset monitoring method comprising, for each instance of operation: receiving at an asset monitoring unit operational variable measurements output from a plurality of sensors onboard the asset in use; obtaining a current value of an sensor characteristic for each sensor; and comparing the current sensor characteristic value with a predetermined sensor characteristic value in order to determine automatically within the asset monitoring unit whether a change of one or more sensors has occurred between instances of operation of the asset.

According to a third aspect of the invention there is provided a data carrier comprising machine readable instructions for control of an asset monitoring unit to receive operational variable measurements output from a plurality of sensors during use of the asset; obtain a current value of an sensor characteristic for each sensor; and comparing the current sensor characteristic value with a predetermined sensor characteristic value in order to determine whether a change of one or more sensors has occurred between instances of operation of the asset.

Any of the optional features defined above in relation to the first aspect may be applied to any of the second or third aspect.

A change of one or more sensors may comprise a sensor swap, replacement or repair. Typically the change will comprise replacement of a sensor for another sensor of the same type, although the invention may also be used to detect the replacement of one sensor for another sensor of a different type if appropriate.

BRIEF DESCRIPTION OF THE DRAWINGS

Practicable examples of the invention will now be described in further detail, for illustration only, with reference to the accompanying drawings, in which.

DETAILED DESCRIPTION OF THE INVENTION

The invention derives from the realisation of an equipment health or condition monitoring system can automatically detect a sensor or component swap and can interpret any resulting change in readings in a manner that is less likely to trigger erroneous adverse condition alarms.

An asset as referred to herein typically refers to a machine or a number of machines, which are inter-reliant for correct operation thereof. Computer controlled condition monitoring systems are used conventionally to monitor the behavior of machinery. Simple algorithms may be used to monitor devices having a single, or relatively few, degrees of freedom such as valves, pistons, simple rotating drives and the like. However more complicated monitoring systems are put in place where a machine or system has a number of interdependent sub-assemblies or components, each of which having a number of control inputs and outputs. Accordingly, equipment condition monitoring units for such complex machines typically receive operation data from a number of different sub-assemblies or components of the asset. Tens or hundreds of sensors may be involved.

Figure 1:
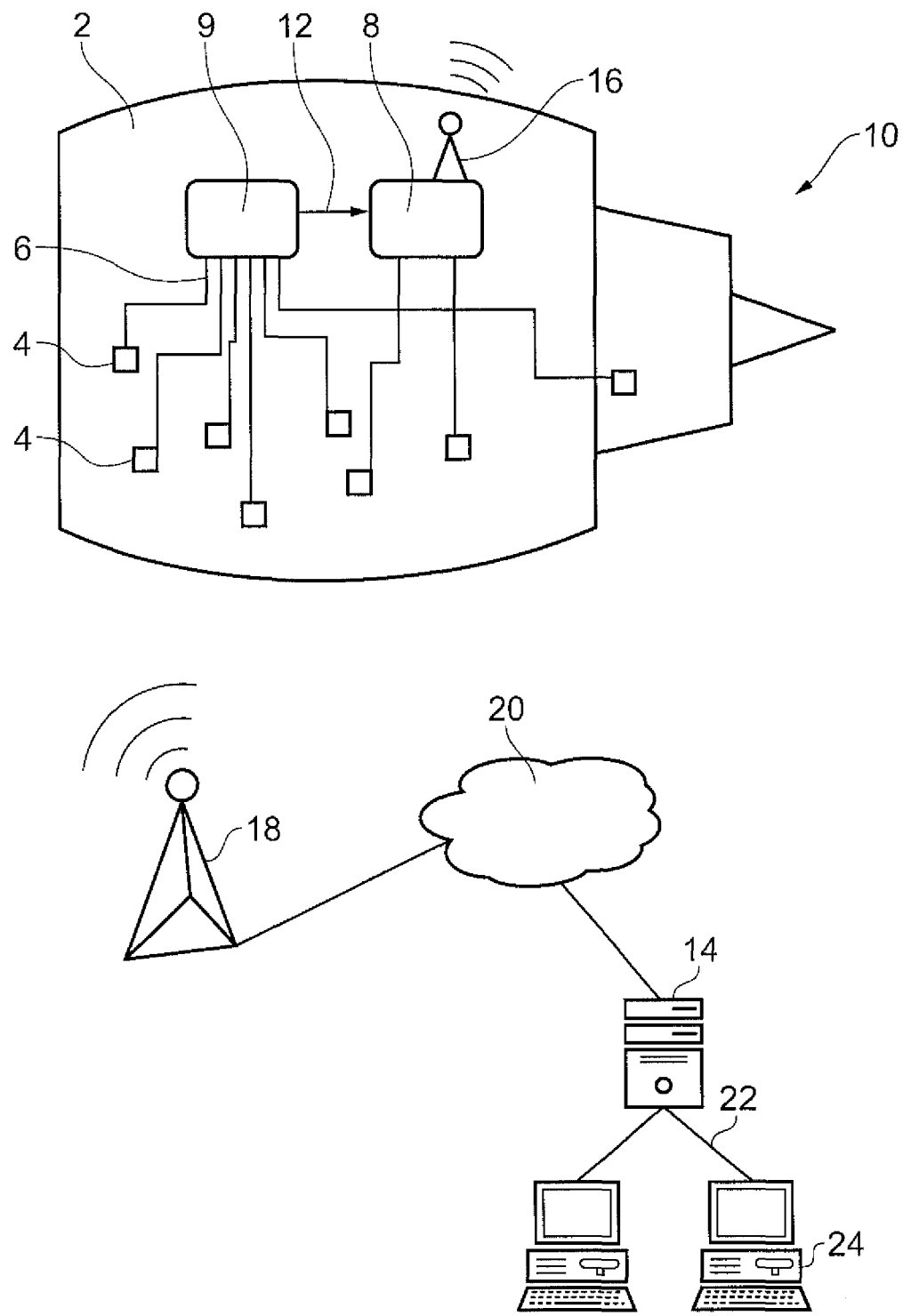
FIG. 1 shows a schematic of an asset and a wider system according to one example of the invention.

Turning firstly to FIG. 1, there is shown an asset in the form of a gas turbine engine 2. It is to be understood that an aircraft engine provides just one example of complex machinery to which the present invention may be applied. The invention may be applied to a variety of other high value assets for which the close monitoring of asset operation is important to ensure the desired life cycle of the asset is achieved, for example by allowing servicing and maintenance schedules to be planned and executed in a timely and efficient manner so as to avoid unwanted down time of the asset. Other examples of such assets may include: propulsion equipment, such as other types of engines, for example, for marine or other aerospace applications; pumps or turbines or other machinery for industrial applications, for example within the oil and gas industry, power generation, including renewable energy or nuclear energy applications. Examples of such assets may include steam turbines, tidal or wind turbines or the like.

The engine 2 of FIG. 1 comprises multiple sensors 4 connected via a local network 6 to an engine monitoring unit (EMU) 8. In the example shown, it can be seen that the asset comprises both an electronic engine controller (EEC) 10 and an EMU 8 which are in communication, at least for dissemination of data from the EEC to the EMU, but typically also for two-way communication of data. The EEC 9 and EMU 8 may be in communication via a data bus 12, which is typically a conventional engine or aircraft data bus. Thus the EEC may receive data from the sensors 4 via local network which may be communicated to the EMU 8. In alternative arrangements, the EMU 8 may receive sensor data without involving the EEC.

A wired connection may be established between the sensors 4 and the EMU 8 for transmission of sensor data thereto. The local network 6 for the asset 2 may comprise a so-called harness, thereby providing such wired connections. Additionally or alternatively a suitable connection may be achieved using wireless communication technology, such as Wi-Fi®, Bluetooth®, or similar.

Data relating to the operation of an engine 2 is collected over the engine operational life using sensors 4 and comprises a measure of a variety of operational parameters under conventional equipment health monitoring (EHM) practices. Conventional types of sensors known to those skilled in the art are located on an engine or aircraft to generate readings of any or any combination of operating time, cycle time or frequency, operational speeds (such as rotor speeds), temperatures, pressures (such as fluid pressure), fluid flow (including fuel consumption), vibrations, accelerations, forces and the like, as well as operational context, such as for example Weight on Wheels (WoW) signals, engine operator inputs via manual controls, other engine demands, or the like.

FIG. 1 also shows an overview of a wider system 10 in which the present invention may be incorporated. Whilst a single engine is referred to below, it will be appreciated that the invention can be applied to other gas turbine engine scenarios, including multiple engines on a single aircraft, a fleet of aircraft, or else one or more gas turbine engine used for other applications.

In this embodiment, the EMU 8 gathers the necessary data from the data bus 12 and records (and/or conditions) the data needed for EHM purposes for secure transmission to a remote monitoring centre, where the data is received and processed and the necessary resulting actions determined. In this manner the data may be stored both locally and/or remotely.

The operational data for the engines 2 is communicated to a remote or central control and/or monitoring facility, where records for all engines in the fleet are gathered. This is achieved by transmission of operational data, typically at the end of each aircraft flight, from the engine or associated aircraft to a control centre server 14. In the embodiment shown one or more wireless transmitters 16 associated with each engine transmit data signals to a receiver 18, which may comprise a base station, for example within a cellular network. The data is transmitted from the receiver 18 to the server 14 via a wide area network (WAN) such as the internet 20.

A variety of methods for transmission of operational data may be used. For example, data may be transmitted via existing aviation communication channels, e.g. in flight via satellite to ground. Alternatively operational data may be recorded to a removable data storage device such as a memory stick or laptop for subsequent retrieval by and/or transmission to the server 14. In some embodiments, other wireless data transmission protocols may be used such as Wi-Fi.

The server 14 is associated with a network 22, typically via a secure local area or wide area network, over which the operational data can be disseminated for processing and or analysis using networked work stations 24. The combination of server 14 and network 22 provides a remote monitoring or control centre and may comprise an asset monitoring service provider or else the asset operator organisation.

Additionally or alternatively, it is possible that the relevant processing of data could be carried out on-board an engine 2 or aircraft by EMU 8 or else by other processing means mounted thereon. Necessary actions could then be taken by the local/on-board monitoring device and/or subsequently communicated to the relevant monitoring or control centre and/or engine operator as necessary.

Furthermore, in one embodiment the EMU could perform a first stage of data processing to determine the operational condition of the asset. If a normal asset operation is determined, then only summary data or a subset of the data need be transmitted to the monitoring facility. However if an unfavorable condition or else a fault is determined by the monitoring unit, then a larger volume of data pertaining to said condition or fault will be transmitted. The system would also allow for a mass offload of operation data from the monitoring unit in certain circumstances.

In any of the above described embodiments, the operational data (i.e. the values of the operational variables) from the sensors 4 is processed locally or remotely so as to allow appropriate actions to be undertaken, such as the output and/or transmission of information, instructions, alerts and/or control signals derived from the operational variables.

Figure 2:
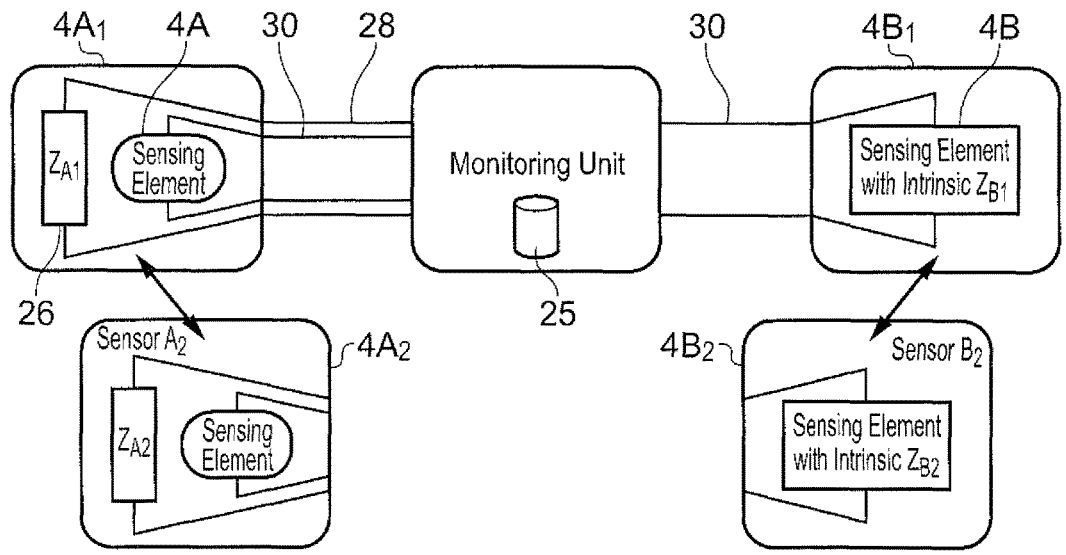
FIG. 2 shows a schematic of an on-board asset monitoring system according to an example of the invention.

In FIG. 2, there is shown a schematic representation of an on-board system according to the invention. The EMU 8 can receive the measurements from sensors 4 in a normal manner in which the sensors operate passively with respect to the EMU. However in accordance with the invention, the EMU 8 is also configured to measure a characteristic of the sensors 4 themselves. This may be performed by one or more modules of computer-readable code, e.g. software implemented routines for control of the EMU 8, to obtain measurements of one or more characteristic of the sensors at one or more times during an instance of use of the engine 2.

In a preferred embodiment EMU 8 may enter a test or checking routine or mode, in which the EMU gathers the required readings from the sensors. This may be instigated during engine startup, e.g. as a test phase, prior to entering normal operation or else at one or more times during normal operation of the EMU (i.e. concurrently). It is also possible that same routine may be entered at the end of an instance of use of the engine, e.g. after landing of an aircraft.

The sensor characteristic measured by the EMU is preferably unique to an individual sensor such that, if one sensor is swapped for another sensor of the same type, the EMU can recognise that swap via the measured characteristic. It is important to note that the sensors of the same type are typically manufactured so as to be functionally equivalent for the primary intended purpose of the sensor. However the invention seeks to differentiate between sensors by characteristics that differ from sensor to sensor. Such characteristic may be intrinsic to the sensor based upon variations in the sensors occurring due to their method of manufacture. Alternatively such a characteristic may be artificially added to the sensor as an additional component or element to distinguish between a sensor that is already in service and one that has not yet been used.

It is a generally undesirable for sensors with the same part number to be made with different characteristics so, in order that all sensors of the same type can have the same part number, the EMU will need to be able to measure the operational characteristic (e.g. impedance) with enough accuracy and resolution to be able to detect the variance which naturally exists in these characteristics (e.g. impedances) from sensor to sensor. In this regard, it is advantageous to select a characteristic with a large natural variance, as this will make the task of identifying different sensors easier. It is also advantageous to select a characteristic which is common to a number of different types of sensors so that common routines can be run to check for multiple different types of sensors at once.

To this end, it is determined that the operational characteristic for a particular type of sensor can vary over a normal probability distribution, such that the determined values of said characteristic that are relatively close (e.g. within 1 or 2 standard deviations) to the mean value for that type of sensor can be determined to be indicative of sensor type.

In the present embodiment, the EMU 8 is configured to measure the impedance of sensors 4. In other embodiments, there are other electrical parameters which could be measured as would be understood by the skilled person, such as, bias current or back EMF. The selected measured parameter will depend on a number of things including the properties of the component being monitored and so it is possible that a non-electrical characteristic of the sensor or component could be monitored instead.

Two different examples of sensor arrangement are shown in FIG. 2, either or both of which may be included in a single on-board system according to the invention. The monitoring unit in any embodiment typically has a local data store 25 to allow recording of measured sensor characteristic values.

A first type of sensor 4A$_1$ does not display a significant enough variance in intrinsic impedance of the sensing element 4A to allow the monitoring unit 8 to measure reliably a change in impedance between different sensors of that type. Accordingly an impedance component 26 (i.e. having an impedance value $Z_{A1}$) is added to the sensor such that the monitoring unit can interrogate the component 26 to establish if the sensor 4A$_1$ has been previously in service.

It is possible that the component 26 is modified by one or more instances of use. The component may deteriorate upon first use or may deteriorate over successive uses so that the monitoring unit 8 can determine whether one or more previous instances of use have been undertaken by comparing the measured value with a predetermined value, such as a threshold value or else a previously measured value.

In this example, a separate link 28 is established between the EMU 8 and the impedance 26, in addition to a conventional wired or wireless data link 30 for sending sensor readings to the EMU 8, to undertake the necessary sensor characteristic measurement.

In the example of sensor 4B$_1$, the sensor 4B has an intrinsic impedance ($Z_{B1}$), which varies sufficiently between different sensors of that type to be directly measurable by the monitoring unit 8. Suitable sensors of this type may include, for example, a speed probe coil or vibration sensor. The impedance of such a sensor can be measured directly using the existing link 30 without the need for additional wiring.

When sensor 4A$_1$ or 4B$_1$ is swapped for an equivalent new sensor of the same type, identified as sensor 4A$_2$ or 4B$_2$, the monitoring unit 8 measures the characteristic of the new sensor 4A$_2$ or 4B$_2$ and compares it to the value stored in data store 25 from the previous instance of use for sensor 4A$_1$ or 4B$_1$. Accordingly EMU 8 can acknowledge the sensor swap from the difference in impedance values.

A predetermined impedance value range may be stored for a particular type of sensor. Accordingly an impedance difference of greater than 5%, or even 1% or 2%, of that range may be determined to constitute a sensor swap event. Depending on the range of the values for a sensor type, it is possible that an impedance difference, or other sensor characteristic value, of 0.1% or more may be detected and/or used to infer a sensor change.

Figure 3:
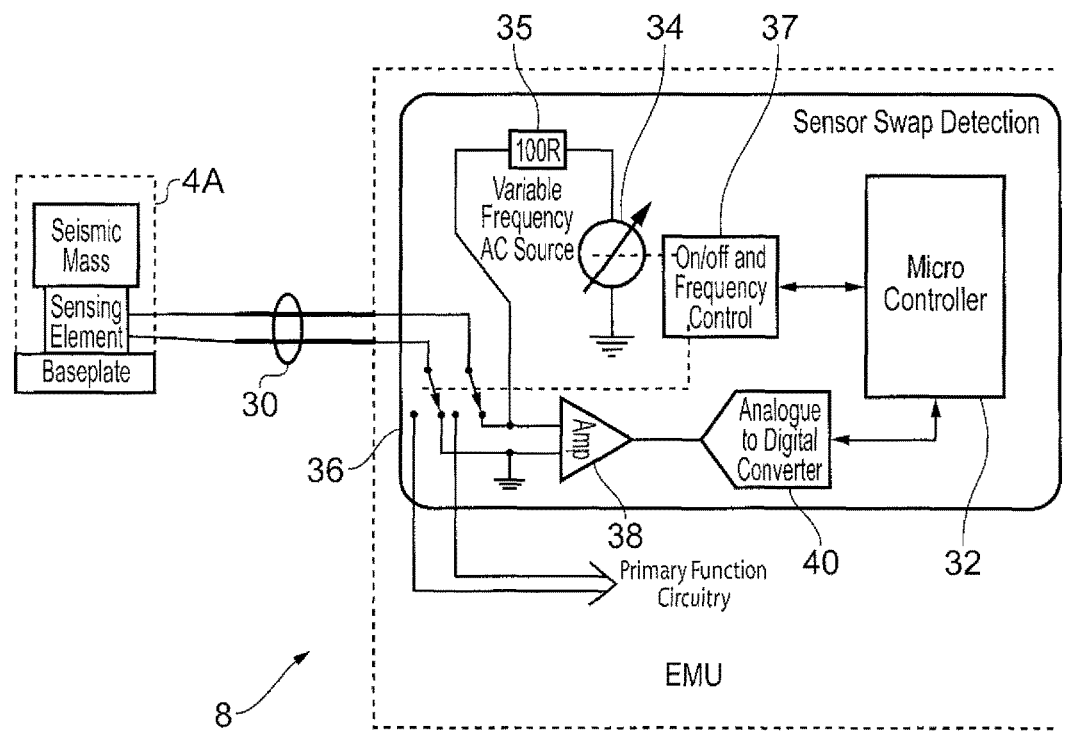
FIG. 3 shows one example of asset monitoring circuitry in accordance with the invention.

Turning now to FIG. 3 there is shown a more detailed example of an arrangement for detecting sensor swap in a sensor having an intrinsic sensor characteristic that is measurable by EMU 8. In this example the sensor 4A is a piezoelectric vibration transducer, e.g. having a seismic mass connected to a base member by a sensing element, although the other details of FIG. 3 are not specific to that sensor type. Electronic sensor swap detection hardware and software has been added to complement a conventional EMU 8. The software resides in the microcontroller and is used to control the switching between sensor swap detection functionality when the system is first powered up and primary vibration monitoring functionality once the unit has finished initialising following a power up.

The sensor swap detection hardware comprises a controller 32, a switching arrangement 36 and a variable frequency AC power source 34, which can supply power via suitable resistor 35. The power source 34 is connected to the sensor by switches 36 and resistor 35 to allow selective switching between the primary EMU function and the sensor swap detection function. Such an arrangement allows for selective application of an AC signal to the sensor 4A via existing wiring 30 of the sensor harness.

When the sensor swap detection functionality is switched in, the microcontroller 32 can apply a fixed frequency ac supply to the sensor 4A and infer the sensors impedance by measuring the magnitude of the ac voltage seen at the EMU connections to the sensor. Alternatively the microcontroller can apply a varying AC signal to search for a frequency where the natural resonance of the sensor produces the lowest impedance to be measured. The advantage of doing this is that there may be more sensor-to-sensor variance when the resonant point is searched for as there are two parameters involved in the determination, i.e. both the frequency and the impedance measurement. Depending on which embodiment is used, an on/off and/or frequency control unit 37 may be implemented for control of the AC power source 34 and switches 36.

The microcontroller can measure the magnitude of the signal after conditioning through an amplifier 38 and an analogue to digital converter 40. In this case the application measures intrinsic impedance and no extra engine harness wiring is needed.

Figure 4:
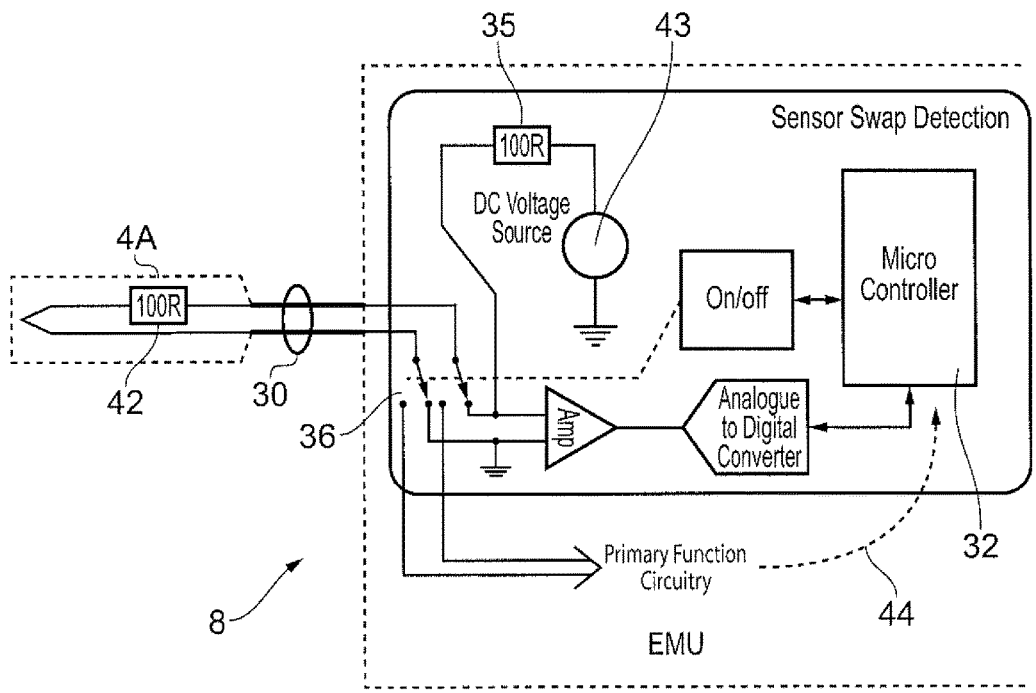
FIG. 4 shows a second example of asset monitoring circuitry in accordance with the invention.

In the example of FIG. 4 the sensor 4A has been provided with a dedicated added impedance 42, e.g. a resistor 42 of known value and with appropriate variance. In this case an impedance (DC resistance) has been added in series with one of the legs of a thermo-couple sensor. Such an embodiment may be used for example if an intrinsic impedance can be identified but it does not have sufficient sensor-to-sensor variance.

The sensor swap detection hardware is the same as described above in relation to FIG. 3 with the exception of the power source arrangement 34 being modified to provide a DC power source 43. The electronics for such an embodiment are less complex as it is only necessary to measure DC resistance and so only on/off switch control is needed in place of an AC control.

Thermocouples are used to measure temperature and so it is likely that the temperature of the sensor may not be the same every time the impedance measurement occurs (even when typically at EMU power up). For this reason the added resistor 42 may be selected to have a low temperature co-efficient. Any output voltage from the thermocouple would also need to be compensated for but this could be done with some feedback 44 (e.g. of temperature measurement) from the primary EMU or sensor function to the microcontroller 32. In this case the impedance could be added in series with the signal because the electronics for the primary function will itself have a high input impedance and draw relatively very little current from the sensor. Thus the effect (on the primary function of the EMU/sensor) of the addition of the resistance 42 will be insignificant.

The provision of feedback 44 from the sensor/EMU to the sensor swap detection controller proposed for this embodiment may be used in any other embodiment as necessary. If this feature is not used, care will be needed to select an impedance which does not vary substantially with environmental parameters in order to avoid falsely detecting a sensor change, for example, due to a change of impedance when the temperature changes.

Figure 5:
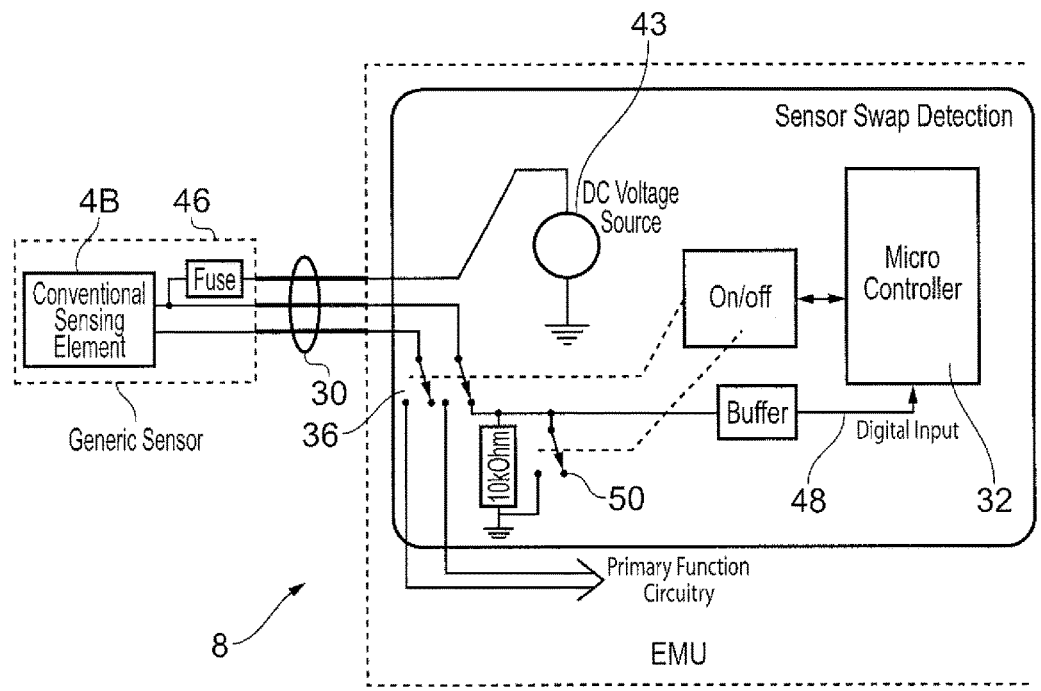
FIG. 5 shows a third example of asset monitoring circuitry in accordance with the invention; and, FIG. 6 shows further detail of an example of circuitry for use in conjunction with the invention.

In FIG. 5 an embodiment is presented that is similar to the above described example of FIG. 4. However in this example a sensor 4B is used having an added impedance 46 that varies significantly with an instance of use. In this example a fuse 46 is added to the sensor. When the sensor 4B has not been used on engine before the fuse 46 will be intact and present a very low impedance. In this example, it is possible to use a digital input 48 to the microcontroller and so the amplifier 38 and analogue to digital 40 circuitry is not required. A further switch 50 is provided under the control of the microcontroller 32. With a new sensor and an intact fuse the system would present a logic "high" to the microcontroller 32. The microcontroller can then close switch 50 and draw enough current to blow the fuse.

The signal then presented to the microcontroller would then be a logic "low" and would remain so for the operational life of the sensor (as the fuse is now blown) until a new sensor is added. Thus upon a sensor swap the microcontroller would initially see a logic "high" indication of a new sensor being used. This method may have the disadvantage that an extra wire 46 may be needed to be added to the existing engine harness.

In any of the above described embodiments, the sensor swap detection hardware/system may be provided as an integral part of the EMU or as a separate dedicated function under the control of the EMU and in communication therewith. In one embodiment, the controller 32 is arranged to further receive the data indicative of the operational variables measured by said sensors. In any embodiment the controller 32 or another EMU controller can compare the currently determined sensor characteristic with a predetermined or previously stored value. A determination of a difference between the stored and current values, subject to tolerances, may be used to that a sensor swap has occurred.

In one embodiment, the controller 32 is arranged to further receive a data identifier for the sensor 4, such that the controller 32 can acknowledge the type of sensor that is installed. A part number may be used for this purpose. The predetermined characteristic value for the sensor may be logged against the sensor type, for example within a database stored by the EMU, such that sensor types and values can be easily updated over time as may be necessary. In another embodiment, the controller 32 may determine the type of sensor installed by the determined value of the sensor characteristic. A certainty of determination may be applied based on where the sensor characteristic value lies within a probability distribution (for example, its proximity to a mean sensor characteristic value for a particular type of sensor). Additionally or alternatively, the controller 32 may determine the type of sensor installed by qualifying/comparing the received sensor characteristic value with values of the sensed operational variable measured by the sensor in use.

When the controller determines a sensor swap has occurred, the EMU or other monitoring equipment may apply a different set of instructions or routines to the analysis of the sensor data. For example a calibration routine may be entered to adjust EHM determinations for the new sensor. Additionally or alternatively an assurance rating may be applied to sensor reading for a predetermined time period after a sensor swap until a suitable trend for the new sensor has been established.

Even when the selected impedance has a large natural variance there remains a finite probability that the EMU will not detect a sensor swap (as two sensors may have an impedance with is adequately similar to not be detected as a change), it is important that the system is designed to reduce this probability to an acceptably low level.

Figure 6:
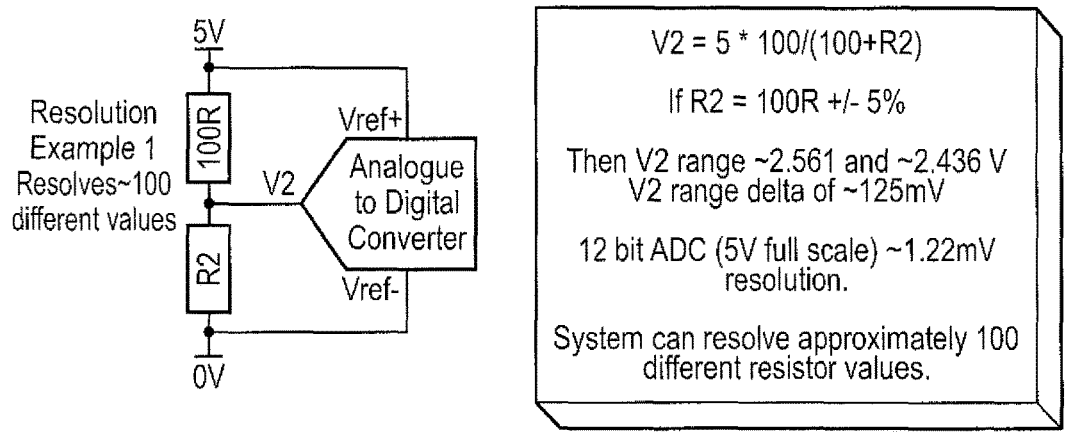

Turning now to FIG. 6, there is provided examples of calculations concerning the probability of not being able to detect the difference between two sensors. The probability of not being able to resolve the difference between two sensors depends on the population distribution of the sensed impedance. If an example of 5% variation in resistance/impedance for the sensor is assumed, then the range of possible voltages at the analogue to digital converter can be determined and after amplification it can be shown that a resolution of 100 different sensor types across the range can be accurately identified.

Assume that we are adding a 5% resistor and that means that we are using resistors from a population which is normally distributed with a mean of 100 Ohms (100 R) and a variance such that the resistors do not need to be selected during production (i.e. 5%=3 sigma (standard deviations)). For the simplest of resolution example we saw that we could resolve 100 resistor values over the +/−5% (6 sigma) range. This gives us a resolution of 0.06 sigma (6/100). With a normal distribution the value with the highest probability of being picked is the mean so the worst case scenario is that we have one sensor with a resistor which is within +/−0.03 sigma of the mean (i.e. in the range 100 R+/−0.1 R) and then the next sensor has a resistor also in that range. With a normal distribution the probability of taking one sample and it being within +/−0.03 sigma of the mean is 0.024 (i.e. 2.4% of the population).

So now we can determine that the probability of having one sensor with a resistor in this range and then picking the next sensor with a resistor which also falls in that range is 0.024*0.024=5.76e−4 or approximately 1 in 1700. This shows that with this basic example we have a chance of 1 in 1700 sensor swaps not being detected by this system.

Simple examples of improving this probability even further may include either (1) reducing the ADC reference voltage to 3V to thereby resolve 170 resistor values or (2) additionally using a bi-polar ADC in conjunction with (1) to thereby resolve in excess of 1000 individual resistor values. Thus it would result that a realistic estimate that only in the range of 1 in 5000 sensor swaps not detected.

The invention claimed is:

1. An equipment monitoring system comprising:
a monitoring unit; and
a plurality of sensors onboard the equipment, the sensors arranged to measure a plurality of operational variables for the equipment in use and the monitoring unit arranged to receive operational variable measurements output from the sensors,
wherein the monitoring unit is arranged to:
determine a current value of a sensor characteristic for a first sensor at a first instance in operation,
determine a current value of a sensor characteristic for a second sensor at a second instance in operation later than the first instance, the sensor characteristic of the first sensor being different from the sensor characteristic of the second sensor, and the first and second sensors being the same type of sensors, and
compare the current sensor characteristic value of the second sensor, each sensor characteristic being an intrinsic characteristic of each sensor which is unique to each sensor, with a predetermined sensor characteristic value in order to determine automatically whether a change of the first sensor to the second sensor has occurred between instances of operation.

2. An equipment monitoring system according to claim 1, wherein the sensor characteristic is substantially constant over the sensor's normal operating range.

3. An equipment monitoring system according to claim 1, wherein the sensor characteristic of at least one sensor is a characteristic of a component added to the sensor.

4. An equipment monitoring system according to claim 1, wherein the sensor characteristic comprises, or is derived from, a measure of the electrical impedance or resistance of the sensor.

5. An equipment monitoring system according to claim 1, wherein the monitoring unit determines the sensor characteristic with a resolution of at least 1 in 100 over a range of variance for said sensor characteristic.

6. An equipment monitoring system according to claim 1, wherein the predetermined sensor characteristic value is a threshold value or band for the sensor characteristic of the sensor.

7. An equipment monitoring system according to claim 1, wherein the predetermined sensor characteristic value is one or more previously stored values for the sensor characteristic.

8. An equipment monitoring system according to claim 1, wherein the monitoring unit is further arranged to determine or receive an identifier for each sensor, said identifier being indicative of a sensor type.

9. An equipment monitoring system according to claim 1, wherein the monitoring unit determines the current value of the sensor characteristic of each sensor as part of a start-up procedure for each instance of use of the equipment.

10. An equipment monitoring system according to claim 1, wherein on the condition that a change of at least one sensor is determined by the monitoring unit, the monitoring unit uses the current value of the sensor characteristic to determine a sensor type for said one or more changed sensors.

11. An equipment monitoring system according to claim 1, wherein the equipment comprises a machine having tens or hundreds of sensors.

12. An equipment monitoring system according to claim 1, wherein the equipment comprises a gas turbine engine.

13. An equipment monitoring method comprising, for each instance of operation:
receiving at an equipment monitoring unit operational variable measurements output from a plurality of sensors onboard the equipment in use;
obtaining a current value of a sensor characteristic for a first sensor at a first instance in operation;
obtaining a current value of a sensor characteristic for a second sensor at a second instance in operation later than the first instance, the sensor characteristic of the first sensor being different from the sensor characteristic of the second sensor, and the first and second sensors being the same type of sensors; and
comparing the current sensor characteristic value of the second sensor with a predetermined sensor characteristic value in order to determine automatically within the equipment monitoring unit whether a change of the first sensor to the second sensor has occurred between instances of operation of the equipment.

14. A data carrier comprising machine readable instructions for control of an equipment monitoring unit to:
receive operational variable measurements output from a plurality of sensors during use of the equipment;
obtain a current value of a sensor characteristic for a first sensor at a first instance in operation;
obtain a current value of a sensor characteristic for a second sensor at a second instance in operation later than the first instance, the sensor characteristic of the first sensor being different from the sensor characteristic of the second sensor, and the first and second sensors being the same type of sensors; and
compare the current sensor characteristic value of the second sensor with a predetermined sensor characteristic value in order to determine whether a change of the first sensor to the second sensor has occurred between instances of operation of the equipment.

15. An equipment monitoring system according to claim 1,
wherein the sensor characteristic comprises a measure of the electrical impedance or resistance of the sensor, and
wherein the monitoring unit determines the sensor characteristic with a resolution of at least 1 in 100 over a range of variance for said sensor characteristic.

16. An equipment monitoring method according to claim 13, wherein the sensor characteristic of at least some of said sensors is an intrinsic characteristic of each sensor.

* * * * *